(12) United States Patent
Ko et al.

(10) Patent No.: US 11,870,292 B2
(45) Date of Patent: Jan. 9, 2024

(54) APPARATUS AND METHOD FOR CONTROLLING POWER OF PARALLEL MULTI PACK SYSTEM

(71) Applicant: LG ENERGY SOLUTION, LTD., Seoul (KR)

(72) Inventors: Young-Jun Ko, Daejeon (KR); Cheol-Taek Kim, Daejeon (KR); Sang-Jin Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 142 days.

(21) Appl. No.: 17/610,371

(22) PCT Filed: Oct. 15, 2020

(86) PCT No.: PCT/KR2020/014115
§ 371 (c)(1),
(2) Date: Nov. 10, 2021

(87) PCT Pub. No.: WO2021/085901
PCT Pub. Date: May 6, 2021

(65) Prior Publication Data
US 2022/0224138 A1 Jul. 14, 2022

(30) Foreign Application Priority Data
Oct. 30, 2019 (KR) .................. 10-2019-0136953

(51) Int. Cl.
*H02J 7/00* (2006.01)
*B60L 58/18* (2019.01)
(Continued)

(52) U.S. Cl.
CPC .......... *H02J 7/00712* (2020.01); *B60L 58/14* (2019.02); *B60L 58/15* (2019.02); *B60L 58/18* (2019.02);
(Continued)

(58) Field of Classification Search
CPC .............. H02J 7/00712; H02J 7/00302; H02J 7/00306; H02J 7/0063; H02J 7/0019;
(Continued)

(56) References Cited

U.S. PATENT DOCUMENTS 6,160,381 A 12/2000 Peterzell
8,718,988 B2 5/2014 Bohlen et al.
(Continued)

FOREIGN PATENT DOCUMENTS

CN 101308921 B * 7/2012 .......... H01M 10/482
CN 106796271 A 5/2017
(Continued)

OTHER PUBLICATIONS

J. Jiang, Y. Zhang, W. Shi, J. Xu, W. Diao and H. Guo, "An analysis of optimized series and parallel method for traction lithium-ion batteries," 2014 International Conference on Intelligent Green Building and Smart Grid (IGBSG), Taipei, Taiwan, 2014, pp. 1-7, doi: 10.1109/IGBSG.2014.6835264. (Year: 2014).*
(Continued)

*Primary Examiner* — M Baye Diao
(74) *Attorney, Agent, or Firm* — Morgan, Lewis & Bockius LLP

(57) ABSTRACT

Disclosed is an apparatus and method for controlling power of a parallel multi pack system. The power control apparatus includes first to $n^{th}$ sensor units measuring operation characteristic values of first to $n^{th}$ battery packs connected in parallel; a power management unit controlling a power consumed in a load or a power provided by a charging device; and a multi pack management unit that: determines a pack resistance of each of the battery packs based on the operation characteristic value of each battery pack received from the sensor units, determines a minimum available power among available powers respectively corresponding
(Continued)

to the pack resistances of the battery packs, determines a total power of the parallel multi pack system so the pack power of a battery pack having a lowest pack resistance becomes identical to the minimum available power, and transmit the determined total power to the power management unit.

14 Claims, 6 Drawing Sheets

(51) Int. Cl.
*B60L 58/15* (2019.01)
*B60L 58/14* (2019.01)
*H01M 10/44* (2006.01)

(52) U.S. Cl.
CPC ......... *H01M 10/441* (2013.01); *H02J 7/0063* (2013.01); *H02J 7/00302* (2020.01); *H02J 7/00306* (2020.01); *B60L 2240/547* (2013.01); *B60L 2240/549* (2013.01); *B60Y 2200/91* (2013.01); *H01M 2220/20* (2013.01)

(58) Field of Classification Search
CPC ........ H02J 7/0068; H02J 7/0013; H02J 7/007; H02J 7/0025; B60L 58/14; B60L 58/15; B60L 58/18; B60L 2240/547; B60L 2240/549; B60L 2240/545; B60L 58/13; B60L 58/21; H01M 10/441; H01M 2220/20; B60Y 2200/91; Y02T 10/70
USPC ........................................................ 320/137
See application file for complete search history.

(56) References Cited

U.S. PATENT DOCUMENTS

| | | | | |
|---|---|---|---|---|
| 8,907,624 | B2 * | 12/2014 | Kumagai | H02J 7/00306 320/116 |
| 10,723,295 | B2 * | 7/2020 | Schumacher | H02J 7/0019 |
| 10,988,049 | B2 * | 4/2021 | Wang | G01R 31/367 |
| 11,255,915 | B2 * | 2/2022 | Lee | H02J 7/00 |
| 11,366,169 | B2 * | 6/2022 | Ahn | G01R 31/389 |
| 11,381,094 | B2 * | 7/2022 | Park | H02J 7/0029 |
| 11,524,588 | B2 * | 12/2022 | Kim | H01M 10/425 |
| 2004/0138785 | A1 | 7/2004 | Emori et al. | |
| 2006/0100833 | A1 | 5/2006 | Plett | |
| 2012/0166031 | A1 | 6/2012 | Nishida | |
| 2013/0106178 | A1 * | 5/2013 | Girard | H02J 7/0048 307/9.1 |
| 2013/0116954 | A1 | 5/2013 | Tazoe et al. | |
| 2017/0123011 | A1 | 5/2017 | Cha et al. | |
| 2018/0026311 | A1 | 1/2018 | Hinterberger et al. | |
| 2019/0123568 | A1 * | 4/2019 | Kaneko | H02J 7/0013 |
| 2019/0178951 | A1 | 6/2019 | Cha et al. | |
| 2021/0024092 | A1 * | 1/2021 | Han | B60L 58/21 |

FOREIGN PATENT DOCUMENTS

| | | | | |
|---|---|---|---|---|
| CN | 109155446 | A | | 1/2019 |
| EP | 2019468 | A1 | | 1/2009 |
| JP | 2002-528022 | A | | 8/2002 |
| JP | 2004-215459 | A | | 7/2004 |
| JP | 2010-203885 | A | | 9/2010 |
| JP | 2011-205827 | A | | 10/2011 |
| JP | 2012-050228 | A | | 3/2012 |
| JP | 2017-060316 | A | | 3/2017 |
| JP | 2019-114324 | A | | 7/2019 |
| KR | 10-0818520 | B1 | | 3/2008 |
| KR | 10-2013-0061719 | A | | 6/2013 |
| KR | 10-1549906 | B1 | | 9/2015 |
| KR | 10-2016-0094882 | A | | 8/2016 |
| KR | 10-1748642 | B1 | | 6/2017 |
| KR | 10-2017-0096409 | A | | 8/2017 |
| WO | WO-2012132246 | A1 * | 10/2012 | .......... B60L 11/1816 |
| WO | 2022/019664 | A1 | | 1/2022 |

OTHER PUBLICATIONS

Office Action dated Sep. 6, 2022 issued by the Japanese Patent Office in corresponding Japanese Patent Application No. 2021-549506.
Extended European Search Report dated Sep. 20, 2022, issued in corresponding European Patent Application No. 20881117.4.
International Search Report issued in corresponding International Patent Application No. PCT/KR2020/014115, dated Jan. 26, 2021.
Plett, "Extended Kalman Filtering for Battery Management Systems of LiPB-based HEV Battery Packs Part 1. Background," Journal of Power Sources, 134: 252-261 (2004).
Plett, "Extended Kalman Filtering for Battery Management Systems of LiPB-based HEV Battery Packs Part 2. Modeling and identification," Journal of Power Sources, 134: 262-276 (2004).
Plett, "Extended Kalman Filtering for Battery Management Systems of LiPB-based HEV Battery Packs Part 3. State and Parameter Estimation," Journal of Power Sources, 134: 277-292 (2004).
Search Report dated Jul. 26, 2023 by the Chinese Patent Office for Chinese Patent Application No. 202080032411.2.

* cited by examiner

FIG. 2

| at=40°C | P(kW) |
|---|---|
| at=30°C | P(kW) |
| at=25°C | P(kW) |
| . | . |
| . | . |
| . | . |
| R1 | P1 |
| R2 | P2 |
| R3 | P3 |
| R4 | P4 |
| R5 | P5 |
| R6 | P6 |
| . | . |
| . | . |
| . | . |
| . | . |

FIG. 5

| | R$_{pack,k}$(mohm) | SOH | P$_{pack,k}$(kW) | P'$_{total}$(kW) | P'$_{pack,k}$(kW) | P$_{total}$(kW) | P$_{pack,k}$(kW) |
|---|---|---|---|---|---|---|---|
| Pack 1 | 120 | 0.94 | 94.0 | | 76.7 | | 62.7 |
| Pack 2 | 110 | 0.95 | 95.0 | | 83.7 | | 68.4 |
| Pack 3 | 100 | 0.96 | 96.0 | 470.0 | 92.1 | 383.8 | 75.2 |
| Pack 4 | 90 | 0.97 | 97.0 | | 102.3 | | 83.6 |
| Pack 5 | 80 | 0.98 | 98.0 | | 115.1 | | 94.0 | ns
APPARATUS AND METHOD FOR CONTROLLING POWER OF PARALLEL MULTI PACK SYSTEM

TECHNICAL FIELD

The present disclosure relates to a power control apparatus and method, and more particularly, to a power control apparatus and method capable of preventing overcharge or overdischarge of a battery pack having a relatively low resistance in a parallel multi pack system in which a plurality of battery packs are connected in parallel.

The present application claims priority to Korean Patent Application No. 10-2019-0136953 filed on Oct. 30, 2019 in the Republic of Korea, the disclosures of which are incorporated herein by reference.

BACKGROUND ART

The application field of batteries is gradually increasing not only to mobile devices such as cellular phones, laptop computers, smart phones and smart pads, but also electric-driven vehicles (EVs, HEVs, PHEVs), large-capacity energy storage systems (ESS), or the like.

A battery system mounted to an electric-driven vehicle includes an n number of battery packs connected in parallel to secure a high energy capacity, and each battery pack includes a plurality of battery cells connected in series. Hereinafter, the assembly in which the n number of battery packs are connected in parallel will be referred to as a parallel multi pack system.

In this specification, the battery cell may include one unit cell or a plurality of unit cells connected in parallel. The unit cell refers to one independent cell that has a negative electrode terminal and a positive electrode terminal and is physically separable. For example, one pouch-type lithium polymer cell may be regarded as a unit cell.

The power of the parallel multi pack system is determined based on a battery pack with a lowest power among the battery packs connected in parallel for safety. That is, the value obtained by multiplying a minimum power among the power values of the battery packs by the number of battery packs becomes a total power of the parallel multi pack system.

For example, in a parallel multi pack system in which five battery packs are connected in parallel, if the powers of the five battery packs are 1 kW, 2 kW, 3 kW, 4 kW and 5 kW, respectively, the total power of the parallel multi pack system becomes is 5*1 kW (5 kW).

A management apparatus of the parallel multi pack system provides information on the total power (5 kW) to a control system of the electric-driven vehicle. Then, the control system adaptively distributes the power supplied to an inverter or a DC/DC converter and the power supplied to an ADAS (Advanced Driver Assistance System) unit, which supports functions of lane departure prevention, front collision warning or the like, and an electrical equipment unit so that the power consumed by the electric-driven vehicle does not exceed 5 kW. In this way, the power is distributed within the range of total power of the parallel multi pack system, which is called a power guideline.

Meanwhile, when the total power of the parallel multi pack system is $P_{total}$, a pack power ($P_k$) of each battery pack is automatically distributed by a resistance ratio $R_{system}/R_{pack,k}$ between a pack resistance ($R_{pack,k}$) of the corresponding battery pack and a total resistance ($R_{system}$) of the parallel multi pack system according to the circuit theory. That is, the pack power ($P_{pack,k}$) of each battery pack is $P_{total}*R_{system}/R_{pack,k}$. Here, k is an index of the battery pack.

Since the pack power ($P_{pack,k}$) is determined not by an available power of the corresponding battery pack but by the total power ($P_{total}$) and the resistance ratio $R_{system}/R_{pack,k}$, as the pack resistance ($R_{pack,k}$) is lower, the pack power ($P_k$) increases. Accordingly, as the pack power ($P_{pack,k}$) of the battery pack having a low pack resistance ($R_{pack,k}$) increases over the available power, the corresponding battery pack may be overcharged or overdischarged.

DISCLOSURE

Technical Problem

The present disclosure is designed to solve the problems of the related art, and therefore the present disclosure is directed to providing an apparatus and method for controlling power of a parallel multi pack system, which may prevent a pack power of a battery pack having a low resistance from exceeding an available power to cause overcharge or overdischarge, in determining a total power of a parallel multi pack system.

Technical Solution

In one aspect of the present disclosure, there is provided an apparatus for controlling a power of a parallel multi pack system, comprising: first to $n^{th}$ sensor units configured to measure operation characteristic values of first to $n^{th}$ battery packs that are included in the parallel multi pack system and connected to each other in parallel; a power management unit configured to control a power consumed in a load or a power provided by a charging device to correspond to a total power of the parallel multi pack system; and a multi pack management unit operatively coupled to the first to $n^{th}$ sensor units and the power management unit.

Preferably, the multi pack management unit may be configured to determine a pack resistance of each of the first to $n^{th}$ battery packs based on the operation characteristic value of each battery pack received from the first to $n^{th}$ sensor units, determine a minimum available power among available powers respectively corresponding to the pack resistances of the battery packs by using pre-defined correlation information between pack resistance and available power, determine the total power of the parallel multi pack system so that the pack power of a battery pack having a lowest pack resistance becomes identical to the minimum available power, and transmit the determined total power of the parallel multi pack system to the power management unit.

Preferably, the power management unit may be configured to control the power consumed in the load or the power provided by the charging device so as not to exceed the total power of the parallel multi pack system.

In the present disclosure, the correlation information may be a pack resistance-available power look-up table in which the available power of the battery pack is defined according to the pack resistance of the battery pack.

In an embodiment, the multi pack management unit is configured to periodically receive a measured voltage value and a measured current value of each battery pack from the first to $n^{th}$ sensor units, and determine the pack resistance of each battery pack by analyzing the plurality of measured voltage values and the plurality of measured current values by means of linear regression analysis.

Preferably, the multi pack management unit may be configured to calculate the total power of the parallel multi pack system using the following equation.

$$P_{total} = \min(P_{pack,k}) * \min(R_{pack,k}) / R_{system}$$

$$R_{system} = [\Sigma(1/R_{pack,k})]^{-1}$$

(k is an integer from 1 to n; n is the number of battery packs; $P_{total}$ is the total power of the parallel multi pack system; $P_{pack,k}$ is a pack power of a $k^{th}$ battery pack; $R_{pack,k}$ is a pack resistance of the $k^{th}$ battery pack; $R_{system}$ is a total resistance of the parallel multi pack system; and min( ) is a function that returns a minimum value among a plurality of input variables)

Preferably, the multi pack management unit may be configured to calculate the pack power of each battery pack using the following equation.

$$P_{pack,k} = P_{total} * R_{system} / R_{pack,k}$$

($P_{pack,k}$ is the pack power of the $k^{th}$ battery pack; $P_{total}$ is the total power of the parallel multi pack system; $R_{system}$ is the total resistance of the parallel multi pack system; and $R_{pack,k}$ is the pack resistance of the $k^{th}$ battery pack) In the present disclosure, since the plurality of battery packs are connected in parallel, when the plurality of battery packs are discharged or charged, the pack power of each battery pack corresponds to a value calculated by the above equation.

The power control apparatus according to the present disclosure may further comprise a communication unit interposed between the multi pack management unit and the power management unit.

Preferably, the parallel multi pack system may be mounted to an electric-driven vehicle, and the power management unit may be included in a control system of the electric-driven vehicle.

In another aspect of the present disclosure, there is also provided a battery management system and an electric-driven vehicle, comprising the apparatus for controlling power of a parallel multi pack system.

In another aspect of the present disclosure, there is also provided a method for controlling a power of a parallel multi pack system, comprising: (a) providing first to $n^{th}$ sensor units configured to measure operation characteristic values of first to $n^{th}$ battery packs that are included in the parallel multi pack system and connected to each other in parallel; (b) determining a pack resistance of each of the first to $n^{th}$ battery packs based on the operation characteristic value of each battery pack received from the first to $n^{th}$ sensor units; (c) determining an n number of available powers respectively corresponding to the pack resistances of the battery packs by using pre-defined correlation information between pack resistance and available power, and a minimum available power thereof; (d) determining the total power of the parallel multi pack system so that the pack power of a battery pack having a lowest pack resistance becomes identical to the minimum available power; and (e) controlling charging or discharging of the first to $n^{th}$ battery packs so as not to exceed the total power of the parallel multi pack system.

Advantageous Effects

According to the present disclosure, the total power of the parallel multi pack system is adjusted so that the pack power of the battery pack having a low resistance among the battery packs included in the parallel multi pack system becomes identical to a minimum available power among available powers of the battery packs, thereby preventing the battery pack having a low resistance from being overcharged or overdischarged. As a result, safety and reliability may be improved when the parallel multi pack system is charged or discharged.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 2 is a diagram showing an example of a pack resistance-available power look-up table according to an embodiment of the present disclosure.

FIG. 5 is a table comparatively showing a total power of a parallel multi pack system and a pack power of each battery pack in an embodiment where the method for controlling power of a parallel multi pack system according to the present disclosure is applied and a comparative example where the prior art is applied.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the embodiments described below, a battery cell refers to a lithium secondary battery. Here, the lithium secondary battery collectively refers to a secondary battery in which lithium ions act as operating ions during charging and discharging to cause an electrochemical reaction at a positive electrode and a negative electrode.

Meanwhile, even if the name of the secondary battery changes depending on the type of electrolyte or separator used in the lithium secondary battery, the type of packaging material used to package the secondary battery, and the interior or exterior structure of the lithium secondary battery, as long as lithium ions are used as operating ions the secondary battery should be interpreted as being included in the category of the lithium secondary battery.

The present disclosure may also be applied to other secondary batteries other than the lithium secondary battery. Therefore, even if the operating ions are not lithium ions, any secondary battery to which the technical idea of the present disclosure may be applied should be interpreted as being included in the category of the present disclosure regardless of its type.

In addition, it should be noted in advance that the battery cell may refer to one unit cell or a plurality of unit cells connected in parallel.

Figure 1:
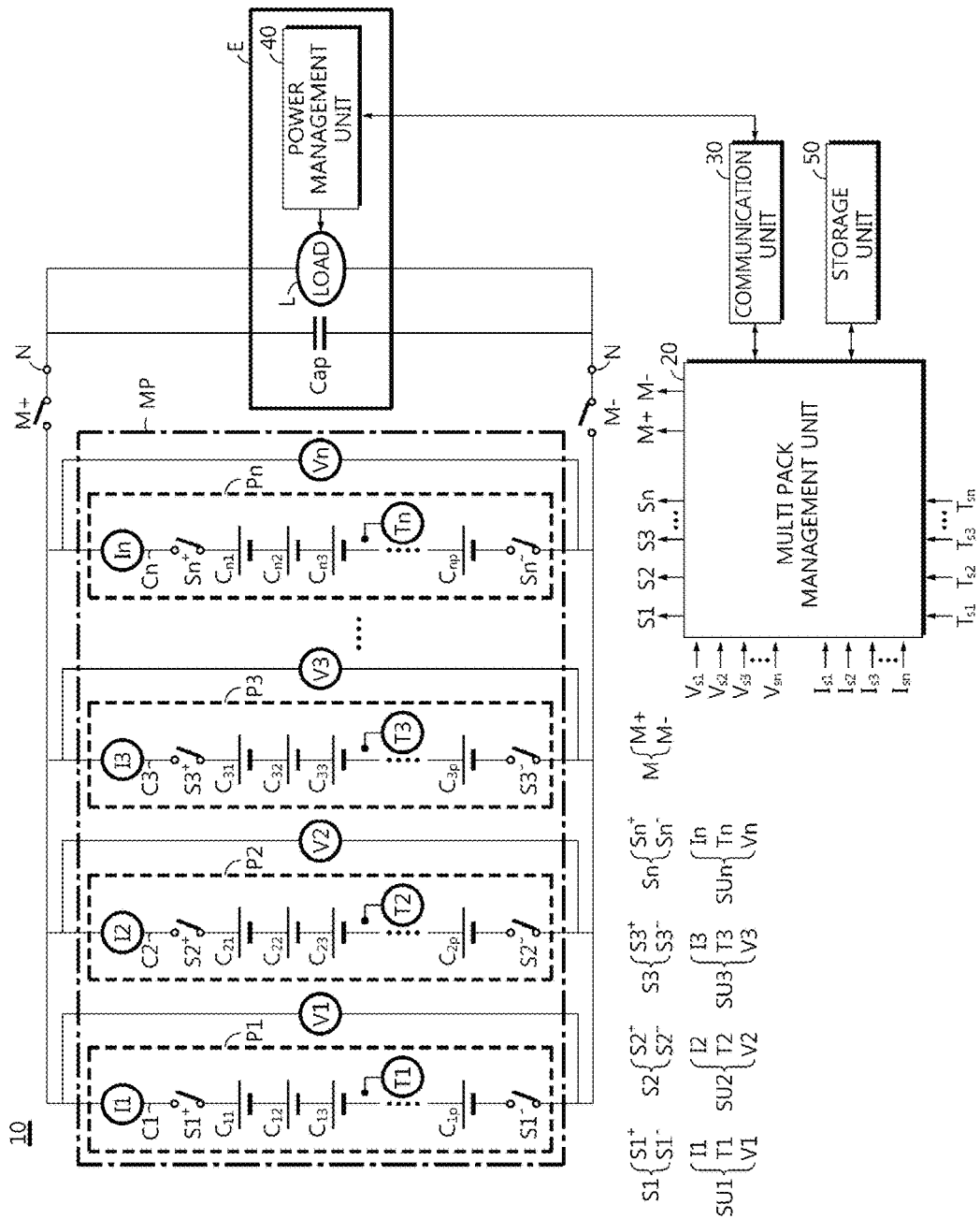
FIG. 1 is a block diagram showing a configuration of an apparatus for controlling power of a parallel multi pack system according to an embodiment of the present disclosure.

FIG. 1 is a block diagram showing a configuration of an apparatus for controlling power of a parallel multi pack system according to an embodiment of the present disclosure.

Referring to FIG. 1, a power control apparatus 10 according to an embodiment of the present disclosure is a device for controlling a power of a parallel multi pack system MP in which a plurality of battery packs P1 to Pn are connected in parallel, and the power control apparatus 10 adaptively controls a total power ($P_{total}$) of the parallel multi pack system MP to prevent some of the battery packs having relatively low pack resistance from being overcharged or overdischarged.

In the present disclosure, the parallel multi pack system MP is defined as a battery system including the first to $n^{th}$ battery packs P1 to Pn that are connected in parallel through first to $n^{th}$ switch units S1 to Sn.

The parallel multi pack system MP may be connected to a load L through an external switch unit M. The external switch unit M includes an external high-potential switch M+ and an external low-potential switch M−. The external high-potential switch M+ and the external low-potential switch M− may be relay switches, but the present disclosure is not limited thereto.

If the external high-potential switch M+ and the external low-potential switch M− are turned on, the parallel multi pack system MP is electrically connected to the load L. Conversely, when the external high-potential switch M+ and the external low-potential switch M− are turned off, the electrical connection between the parallel multi pack system MP and the load L is released.

The power control apparatus 10 of the parallel multi pack system MP receives a control command for charging start, charging end, discharging start or discharging end from a control device that controls the load L, and controls turn-on or turn-off operation of the external switch unit M according to the control command.

Preferably, the parallel multi pack system MP may be mounted to an electric-driven vehicle E, but the present disclosure is not limited thereto. The electric-driven vehicle E refers to a vehicle that can be driven by a motor, such as an electric vehicle or a hybrid electric vehicle.

The load L is a device that receives power from the parallel multi pack system MP, and may be an inverter included in an electric-driven vehicle E as an example. The inverter is a power conversion circuit that is installed at a front end of an electric motor of the electric-driven vehicle E to convert a DC current supplied from the parallel multi pack system MP into a 3-phase AC current and supplies the 3-phase AC current to the electric motor.

The load L may also be a DC/DC converter. The DC/DC converter is a power conversion circuit that converts a voltage of a DC current supplied from the parallel multi pack system MP into a drive voltage of an electric equipment unit of the electric-driven vehicle E or a drive voltage of an ADAS unit and then applies the converted voltage to the electric equipment unit or the ADAS unit.

In the present disclosure, the type of the load L is not limited to the inverter or the DC/DC converter, and any device or instrument capable of receiving power from the parallel multi pack system MP may be included in the category of the load L regardless of its type.

In the present disclosure, each of the first to $n^{th}$ battery packs P1 to Pn includes a plurality of battery cells connected in series therein. That is, the first battery pack P1 includes first to $p^{th}$ battery cells $C_{11}$ to $C_{1p}$ connected in series. In addition, the second battery pack P2 includes first to $p^{th}$ battery cells $C_{21}$ to $C_{2p}$ connected in series. In addition, the third battery pack P3 includes first to $p^{th}$ battery cells $C_{31}$ to $C_{3p}$ connected in series. In addition, the $n^{th}$ battery pack Pn includes first to $p^{th}$ battery cells $C_{n1}$ to $C_{np}$ connected in series. Though fourth to $n-1^{th}$ battery packs are not shown in the drawing, each of the fourth to $n-1^{th}$ battery packs also includes a p number of battery cells connected in series in the same manner as the illustrated battery packs.

Each of the first to $n^{th}$ battery packs P1 to Pn includes the switch units S1 to Sn therein. That is, the first battery pack P1 includes a first switch unit S1. In addition, the second battery pack P2 includes a second switch unit S2. In addition, the third battery pack P3 includes a third switch unit S3. In addition, the $n^{th}$ battery pack Pn includes an $n^{th}$ switch unit Sn. Though the fourth to $n-1^{th}$ battery packs are not shown in the drawing, each of the fourth to $n-1^{th}$ battery packs also includes a switch unit in the same manner as the illustrated battery packs.

Each of the first to $n^{th}$ switch units S1 to Sn includes a low-potential switch and a high-potential switch. That is, the first switch unit S1 includes a first high-potential switch $S1^+$ installed at a high-potential side of the first battery pack P1 and a first low-potential switch $S1^-$ installed at a low-potential side of the first battery pack P1. In addition, the second switch unit S2 includes a second high-potential switch $S2^+$ installed at a high-potential side of the second battery pack P2 and a second low-potential switch $S2^-$ installed at a low-potential side of the second battery pack P2. In addition, the third switch unit S3 includes a third high-potential switch $S3^+$ installed at a high-potential side of the third battery pack P3 and a third low-potential switch $S3^-$ installed at a low-potential side of the third battery pack P3. In addition, the $n^{th}$ switch unit Sn includes an $n^{th}$ high-potential switch $Sn^+$ installed at a high-potential side of the $n^{th}$ battery pack Pn and an $n^{th}$ low-potential switch $Sn^-$ installed at a low-potential side of the $n^{th}$ battery pack Pn. Meanwhile, though the fourth to $n-1^{th}$ battery packs are not shown in the drawing, each of the fourth to $n-1^{th}$ battery packs also includes a high-potential switch and a low-potential switch in the same manner as the illustrated battery pack. In addition, in each switch unit, any one of the high-potential switch and the low-potential switch may be omitted.

In the following disclosure, when the switch unit is turned on, the low-potential switch may be turned on first and the high-potential switch may be turned on later. Also, when the switch unit is turned off, the high-potential switch may be turned off first and the low-potential switch may be turned off later.

Preferably, the switch employed at the switch units S1 to Sn may be relay switch. As an alternative, the switch units S1 to Sn may be a semiconductor switch such as a MOSFET or a power semiconductor switch, but the present disclosure is not limited thereto.

A capacitor Cap is provided at a front end of the load L. The capacitor Cap is connected in parallel between the parallel multi pack system MP and the load L. The capacitor Cap functions as a filter to prevent a noise current from being applied toward the load L.

The power control apparatus 10 according to the present disclosure includes first to $n^{th}$ current sensors I1 to In. The first to $n^{th}$ current sensors I1 to In are installed on power lines C1 to Cn connected to the first to $n^{th}$ battery packs P1 to Pn, respectively, to measure a current value flowing through the power lines C1 to Cn.

That is, the first current sensor I1 measures a first battery pack current value ($I_{s1}$) flowing through the first power line C1 included in the first battery pack P1. In addition, the second current sensor I2 measures a second battery pack current value ($I_{s2}$) flowing through the second power line C2 included in the second battery pack P2. In addition, the third current sensor I3 measures a third battery pack current value ($I_{s3}$) flowing through the third power line C3 included in the third battery pack P3. In addition, the $n^{th}$ current sensor In measures an $n^{th}$ battery pack current value ($I_{sn}$) flowing through the $n^{th}$ power line Cn included in the $n^{th}$ battery pack Pn. Although not shown in the drawing, the fourth to $n-1^{th}$ current sensors measure current values flowing through the fourth to $n-1^{th}$ power lines included in the fourth to $n-1^{th}$ battery packs, respectively.

In the drawing, it is shown that first to $n^{th}$ current sensors I1 to In are included in the battery packs, respectively. However, in the present disclosure, the first to $n^{th}$ current sensors I1 to In may also be installed outside the battery packs, without limitation.

The first to $n^{th}$ current sensors I1 to In may be Hall sensors. The Hall sensor is a known current sensor that outputs a voltage signal corresponding to the magnitude of a current. In another example, the first to $n^{th}$ current sensors I1 to In may be sense resistors. If the voltage applied to both ends of the sense resistor is measured, the magnitude of current flowing through the sense resistor may be determined using Ohm's law. In other words, if the magnitude of the measured voltage is divided by a known resistance value of the sense resistor, the magnitude of current flowing through the sense resistor may be determined.

The power control apparatus 10 according to an embodiment of the present disclosure also includes first to $n^{th}$ voltage sensors V1 to Vn. The first voltage sensor V1 measures a first battery pack voltage value ($V_{s1}$) corresponding to a potential difference between the positive electrode and the negative electrode of the first battery pack P1. In addition, the second voltage sensor V2 measures a second battery pack voltage value ($V_{s2}$) corresponding to a potential difference between the positive electrode and the negative electrode of the second battery pack P2. In addition, the third voltage sensor V3 measures a third battery pack voltage value ($V_{s3}$) corresponding to a potential difference between the positive electrode and the negative electrode of the third battery pack P3. In addition, the $n^{th}$ voltage sensor Vn measures an $n^{th}$ battery pack voltage value ($V_{sn}$) corresponding to a potential difference between the positive electrode and the negative electrode of the $n^{th}$ battery pack Pn. Although not shown in the drawing, the fourth to $n-1^{th}$ voltage sensors measures fourth to $n-1^{th}$ battery pack voltage values, respectively.

The first to $n^{th}$ voltage sensors V1 to Vn include a voltage measurement circuit such as a differential amplifier circuit. Since the voltage measurement circuit is well known in the art, the voltage measurement circuit will not be described in detail here.

The power control apparatus 10 according to an embodiment of the present disclosure also includes first to $n^{th}$ temperature sensors T1 to Tn. The first temperature sensor T1 measures a first battery pack temperature value ($T_{s1}$) indicating a surface temperature of a cell located at a predetermined position, for example at a center, of the first battery pack P1. In addition, the second temperature sensor T2 measures a second battery pack temperature value ($T_{s2}$) indicating a surface temperature of a cell located at a predetermined position, for example at a center, of the second battery pack P2. In addition, the third temperature sensor T3 measures a third battery pack temperature value ($T_{s3}$) indicating a surface temperature of a cell located at a predetermined position, for example at a center, of the third battery pack P3. In addition, the $n^{th}$ temperature sensor Tn measures an $n^{th}$ battery pack temperature value ($T_{sn}$) indicating a surface temperature of a cell located at a predetermined position, for example at a center, of the $n^{th}$ battery pack Pn. Although not shown in the drawing, the fourth to $n-1^{th}$ temperature sensors measure fourth to $n-1^{th}$ battery pack temperature values, respectively.

In the present disclosure, the first current sensor I1, the first voltage sensor V1 and the first temperature sensor T1 constitute a first sensor unit SU1. In addition, the second current sensor I2, the second voltage sensor V2 and the second temperature sensor T2 constitute a second sensor unit SU2. In addition, third current sensor I3, the third voltage sensor V3 and the third temperature sensor T3 constitute a third sensor unit SU3. In addition, the $n^{th}$ current sensor In, the $n^{th}$ voltage sensor Vn and the $n^{th}$ temperature sensor Tn constitute an $n^{th}$ sensor unit SUn. Although not shown in the drawing, the fourth to $n-1^{th}$ sensor units also include a current sensor, a voltage sensor and a temperature sensor, respectively.

In some cases, it is obvious that the first to $n^{th}$ sensor units SU1 to SUn may further include sensors for measuring other operating characteristics of the battery pack in addition to the sensors for measuring current, voltage and temperature.

Preferably, the power control apparatus 10 according to an embodiment of the present disclosure also includes a multi pack management unit 20 operatively coupled to the first to $n^{th}$ switch units S1 to Sn and the first to $n^{th}$ sensor units SU1 to SUn.

The multi pack management unit 20 may be operatively coupled with a power management unit 40 of the electric-driven vehicle E, which manages the power consumed in the load L. As a control element provided to a control system included in the electric-driven vehicle E, the power management unit 40 may adaptively manage the magnitude of power consumed in the load L to be suitable for the total power of the parallel multi pack system MP. Here, the total power means a total discharging power of the parallel multi pack system MP.

In the present disclosure, the load L may be replaced with a charging device. In this case, the power management unit 40 may adaptively manage a charging power supplied to the parallel multi pack system MP to be suitable for the total power of the parallel multi pack system MP. Here, total power means a total charging power provided to the parallel multi pack system MP.

Preferably, the power control apparatus 10 according to an embodiment of the present disclosure may further include a communication unit 30 interposed between the multi pack management unit 20 and the power management unit 40. The communication unit 30 forms a communication interface between the multi pack management unit 20 and the power management unit 40.

In the present disclosure, any known communication interface that supports communication between two different communication media may be used as the communication interface. The communication interface may support wired or wireless communication. Preferably, the communication interface may support CAN communication or daisy chain communication.

If a discharging request is received from the power management unit 40 of the electric-driven vehicle E through communication unit 30, the multi pack management unit 20 turns on the external switch unit M to initiate discharging of the parallel multi pack system MP.

For reference, an M+ signal and an M− signal output from the multi pack management unit 20 represent signals that control the on/off operation of the external high-potential switch M+ and the external low-potential switch M−, respectively. In addition, S1 to Sn signals output from the multi pack management unit 20 represent signals that controls the on/off operation of the first to $n^{th}$ switch units S1 to Sn.

The multi pack management unit 20 also controls the operation of the current sensors I1 to In, the voltage sensors V1 to Vn and the temperature sensors T1 to Tn included in the first to $n^{th}$ sensor units SU1 to SUn while the parallel multi pack system MP is being discharged, and periodically records the operation characteristic value of each battery pack received from the current sensors I1 to In, the voltage sensors V1 to Vn and the temperature sensors T1 to Tn in the storage unit 50.

Here, the operation characteristic value includes measured current values ($I_{s1}$ to $I_{sn}$), measured voltage values ($V_{s1}$ to $V_{sn}$) and measured temperature values ($T_{s1}$ to $T_{s2}$) of the first to $n^{th}$ battery packs P1 to Pn as shown in the figure.

The multi pack management unit 20 may also determine a SOC (State Of Charge) of each battery pack based on the operation characteristic values of the first to $n^{th}$ battery packs P1 to Pn.

For example, the multi pack management unit 20 may determine the SOC of the first to $n^{th}$ battery packs P1 to Pn by counting the measured current values ($I_{s1}$ to $I_{sn}$) of the first to $n^{th}$ battery packs P1 to Pn over time. The multi pack management unit 20 may measure the OCV of each pack using the first to $n^{th}$ voltage sensors V1 to Vn before initiating the discharging of the first to $n^{th}$ battery packs P1 to Pn, and determine an initial SOC of each battery pack by referring to an OCV-SOC look-up table to look up a SOC corresponding to the OCV. In addition, the multi pack management unit 20 may count the measured current values ($I_{s1}$ to $I_{sn}$) of the first to $n^{th}$ battery packs P1 to Pn based on the initial SOC over time and record the same in the storage unit 50. The OCV-SOC look-up table may be defined in advance and recorded in the storage unit 50.

As another example, the multi pack management unit 20 may determine the SOC of the first to $n^{th}$ battery packs P1 to Pn using the extended Kalman filter while the parallel multi pack system MP is being discharged. That is, the multi pack management unit 20 may determine the SOC of the first to $n^{th}$ battery packs P1 to Pn by inputting the operation characteristic value of each battery pack received from the first to $n^{th}$ sensor units SU1 to SUn into the extended Kalman filter coded in software, and record the same in the storage unit 50.

The extended Kalman filter is widely known in the technical field to which the present disclosure belongs. As an example, the extended Kalman filter may be an adaptive algorithm based on an equivalent circuit model or an electrochemical reduced order model (ROM).

The SOC estimation using the extended Kalman filter is disclosed in, for example, Gregory L. Plett's paper "Extended Kalman filtering for battery management systems of LiPB-based HEV battery packs, Parts 1, 2 and 3" (Journal of Power Source 134, 2004, 252-261), and this paper may be incorporated as a part of this specification.

Of course, the SOC may be determined using other known methods capable of determining SOC by selectively utilizing the operation characteristic value of the battery pack, in addition to the current counting method or the extended Kalman filter described above.

In another aspect, the multi pack management unit 20 may count a current value measured in a specific voltage range among a plurality of current values for each battery pack recorded in the storage unit 50. In addition, the multi pack management unit 20 may determine a SOH (State Of Health) of each battery pack by referring to a current count value-SOH look-up table in which SOH according to the counted current value of a specific voltage range is defined in advance.

As another example, the multi pack management unit 20 may adaptively determine the SOH of the first to $n^{th}$ battery packs P1 to Pn using the extended Kalman filter while the parallel multi pack system MP is being discharged.

That is, the multi pack management unit 20 may determine the SOH of the first to $n^{th}$ battery packs P1 to Pn by inputting the operation characteristic value of each battery pack received from the first to $n^{th}$ sensor units SU1 to SUn into the extended Kalman filter coded in software.

The SOH estimation using the extended Kalman filter is disclosed in, for example, Korean Patent Registration No. 10-0818520, entitled "Apparatus, method, system and recording medium for estimating a current state and current parameters of an electrochemical cell", which may be incorporated as part of this specification.

Preferably, the multi pack management unit 20 may determine a pack resistance of each battery pack based on the operation characteristic values of the first to $n^{th}$ battery packs P1 to Pn and record the same in the storage unit 50.

As an example, the multi pack management unit 20 may determine an I-V profile for each battery pack by means of linear regression analysis by using a plurality of measured current values and a plurality of measured voltage values for each battery pack recorded in the storage unit 50 while the parallel multi pack system MP is being discharged. Here, the plurality of measured current values and the plurality of measured voltage values are sampled for recent measured values based on a present time point. In addition, the multi pack management unit 20 may determine a slope of the I-V profile, calculate an absolute value of the slope as the pack resistance for each battery pack, and record the same in the storage unit 50.

As another example, the multi pack management unit 20 may refer to the present measured temperature value and SOC for each battery pack recorded in the storage unit 50 while the parallel multi pack system MP is being discharged to determine a pack resistance corresponding to the measured temperature value and SOC by looking up a SOC-temperature-pack resistance look-up table, and record the same in the storage unit 50. Here, the SOC-temperature-pack resistance look-up table has a data structure capable of looking up the pack resistance corresponding to SOC and temperature, and the SOC-temperature-pack resistance look-up table may be defined in advance and recorded in the storage unit 50.

The multi pack management unit 20 also determines an n number of available powers corresponding to the pack resistance of each battery pack by using pre-defined correlation information between pack resistance and available power, and determines a minimum available power among the n number of available powers.

Preferably, the pre-defined correlation may be a pack resistance-available power look-up table capable of looking up the available power according to the pack resistance.

FIG. 2 is a diagram showing an example of a pack resistance-available power look-up table according to an embodiment of the present disclosure.

Referring to FIG. 2, the pack resistance-available power look-up table has a data structure capable of looking up the available power using the pack resistance, and may be defined in advance and recorded in the storage unit 50. It is preferable that the pack resistance-available power look-up table is provided independently according to the temperature of the battery pack. In this case, it may be considered that the available power varies according to the temperature of the battery pack. Preferably, the multi pack management unit 20 may identify the pack resistance-available power look-up table that is to be looked up using the measured temperature value of each battery pack, and determine the available power corresponding to the pack resistance using the identified look-up table.

More preferably, the pack resistance-available power look-up table may be provided independently for each SOH and temperature of the battery pack. In this case, it may be considered that the available power varies according to the temperature and SOH of the battery pack. Preferably, the multi pack management unit 20 may identify the pack resistance-available power look-up table that is to be looked up using the measured temperature value and SOH of each battery pack, and determine the available power corresponding to the pack resistance using the identified look-up table.

In another aspect, the multi pack management unit 20 may determine the available power for each battery pack using the I-V profile generated when determining the pack resistance of each battery pack.

Figure 3:
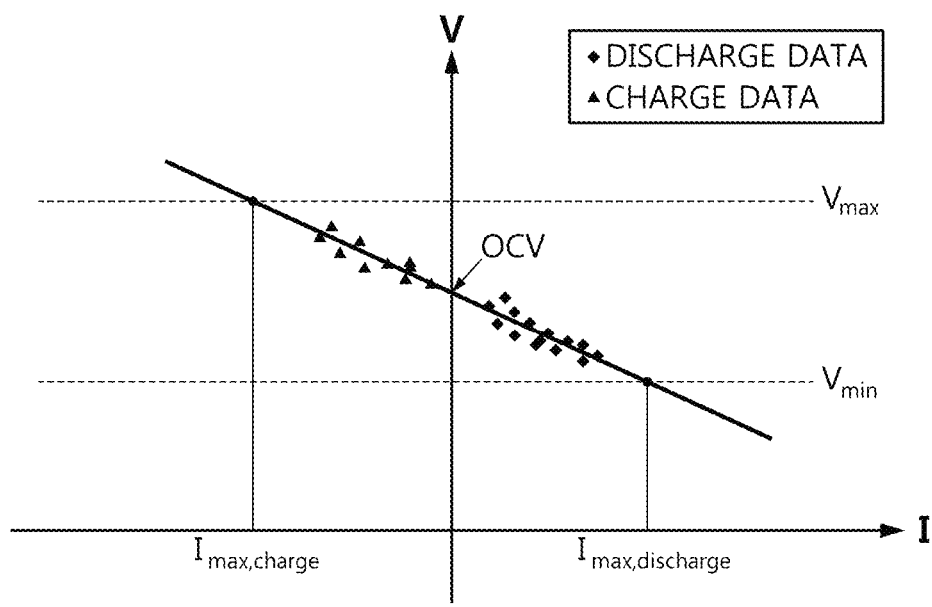
FIG. 3 is a graph showing an example of an I-V profile in determining a pack resistance of a battery pack according to an embodiment of the present disclosure.

FIG. 3 is a graph showing an example of an I-V profile in determining a pack resistance of a battery pack according to an embodiment of the present disclosure.

Referring to FIG. 3, the voltage at an intersection point where the I-V profile meets a V axis is the OCV corresponding to the SOC of the battery pack. Dot marks indicate a plurality of measured voltage values and a plurality of measured current values measured when the parallel multi pack system MP is being discharged. The I-V profile is a straight line generated by means of linear regression analysis for the plurality of measured voltage values and the plurality of measured current values. When the battery pack is being discharged, the measured current value is a positive value, and when the battery pack is being charged, the measured current value is a negative value. In addition, the absolute value of the slope of the I-V profile corresponds to the pack resistance of the battery pack.

When the parallel multi pack system MP is being discharged, the multi pack management unit 20 may determine a current value at an intersection where the I-V profile meets a straight line V=$V_{min}$ representing a discharge lower limit voltage as a maximum discharge current ($I_{max,discharge}$), and determine $V_{min}*|I_{max,discharge}|$ as the available power of the battery pack. In the drawing, diamond marks are coordinates representing the plurality of measured voltage values and the plurality of measured current values measured when the parallel multi pack system MP is being discharged.

Meanwhile, when the parallel multi pack system MP is being charged, the multi pack management unit 20 may determine a current value at an intersection where the I-V profile generated when determining the pack resistance of each battery pack meets the line V=$V_{max}$ representing a charge upper limit voltage as a maximum charge current ($I_{max,charge}$), and determine $V_{max}*|I_{max,charge}|$ as the available power of the battery pack. In the drawing, triangle marks are coordinates representing the plurality of measured voltage values and the plurality of measured current values measured when the parallel multi pack system MP is being charged.

The multi pack management unit 20 determines the available powers of the first to $n^{th}$ battery packs P1 to Pn, then determines a minimum available power among the n number of available powers, and records the same in the storage unit 50.

The multi pack management unit 20 also determines the total power of the parallel multi pack system MP so that the pack power of the battery pack having a lowest pack resistance is identical to the minimum available power, and records the same in the storage unit 50.

Specifically, the multi pack management unit 20 may determine the total power of the parallel multi pack system MP using Equation 1 below.

$$P_{total} = \min(P_{pack,k}) * \min(R_{pack,k}) / R_{system} \qquad \langle \text{Equation 1} \rangle$$

$$R_{system} = [\Sigma(1/R_{pack,k})]^{-1}$$

Here, k is an integer from 1 to n.
n is the number of battery packs.
$P_{total}$ is the total power of the parallel multi pack system.
$P_{pack,k}$ is a pack power of a $k^{th}$ battery pack.
$R_{pack,k}$ is a pack resistance of the $k^{th}$ battery pack.
$R_{system}$ is a total resistance of the parallel multi pack system.
min( ) is a function that returns a minimum value among a plurality of input variables.

Equation 1 may be converted into an equation including the total power term "min($P_{pack,k}$)*n", which is determined according to the prior art, as in Equation 2 below.

$$\begin{aligned} P_{total} &= \min(P_{pack,k}) * \min(R_{pack,k}) / R_{system} \qquad \langle \text{Equation 2} \rangle \\ &= [\min(P_{pack,k})*n] * \min(P_{pack,k}) * \min(R_{pack,k}) / \\ &\quad \{[\min(P_{pack,k})*n] * R_{system}\} \\ &= [\min(P_{pack,k})*n] * \min(P_{pack,k}) / \max(P_{pack,k}) \end{aligned}$$

In the second line of Equation 2 above, "min($R_{pack,k}$)/{[min($P_{pack,k}$)*n]*$R_{system}$" corresponds to a reciprocal of a pack power calculated by the prior art for the battery pack having a lowest resistance among the first to n battery packs P1 to Pn.

It is because the total power of the parallel multi pack system MP calculated according to the prior art is "min $(P_{pack,k})*n$", which is obtained by multiplying the minimum value "min$(P_{pack,k})$" among the pack powers by the number n of battery packs, and the pack power of the battery pack having a lowest resistance corresponds to a value obtained by multiplying a resistance ratio "$R_{system}$/min$(R_{pack,k})$" by the total power "min$(P_{pack,k})*n$" calculated by the prior art.

Since the pack power of the battery pack having a lowest resistance has a maximum value among the n number of pack powers, "min$(R_{pack,k})$/{[min$(P_{pack,k})*n]*R_{system}$}" in the second line of Equation 2 may be replaced with max $(P_{pack,k})^{-1}$, as finally arranged in the third line.

Seeing Equation 2, the total power ($P_{total}$) of the parallel multi pack system MP determined according to the present disclosure corresponds to a value obtained by multiplying the total power "min$(P_{pack,k})*n$" determined according to the prior art by an attenuation factor, namely "min$(P_{pack,k})$/max$(P_{pack,k})$". Here, "min$(P_{pack,k})$/max$(P_{pack,k})$" is a relative ratio between a maximum value and a minimum value among the pack powers and thus is always smaller than 1. Therefore, the total power of the parallel multi pack system MP determined according to the present disclosure is smaller than the total power determined according to the prior art by [min$(P_{pack,k})*n]*[1-$min$(P_{pack,k})$/max$(P_{pack,k})$].

If the pack power ($P_{pack,Rmin}$) of the battery pack having a lowest resistance is calculated using the total power ($P_{total}$) determined by Equation 1, it is equal to the minimum available power among the available powers of the first to $n^{th}$ battery packs as in Equation 3. Therefore, it is possible to fundamentally prevent the phenomenon that the battery pack having a low resistance is overcharged or overdischarged.

$$P_{pack,Rmin} = \{\min(P_{pack,k}) * \min(R_{pack,k}) / R_{system}\} * \{R_{system} / \min(R_{pack,k})\}$$
$$= \min(P_{pack,k})$$
⟨Equation 3⟩

After determining the total power ($P_{total}$), the multi pack management unit 20 may transmit information on the total power ($P_{total}$) to the power management unit 40 of the electric-driven vehicle E through the communication unit 30.

Then, the power management unit 40 controls charging or discharging of the parallel multi pack system MP so that the power of the parallel multi pack system MP does not exceed the total power ($P_{total}$) determined by Equation 1. That is, the power management unit 40 controls the power consumption so that the power consumed in the load L does not exceed the total power ($P_{total}$) determined by Equation 1.

Specifically, the power management unit 40 adaptively distributes the power supplied to an inverter or a DC/DC converter corresponding to the load L and the power supplied to an electrical equipment unit and an ADAS (Advanced Driver Assistance System) unit, which supports functions of lane departure prevention, front collision warning or the like, so as not to exceed the total power ($P_{total}$) of the parallel multi pack system MP.

Meanwhile, if the load L is replaced by a charging device, the power management unit 40 may adaptively adjust the magnitude of the charging voltage and the charging current provided to the parallel multi pack system MP so as not to exceed the total power ($P_{total}$) determined by Equation 1 while the parallel multi pack system MP is being charged using the charging device.

Preferably, the multi pack management unit 20 may be configured to calculate the pack power ($P_{pack,k}$) of each battery pack using Equation 4 below.

$$P_{pack,k} = P_{total} * R_{system} / R_{pack,k}$$
⟨Equation 4⟩

($P_{pack,k}$ is the pack power of the $k^{th}$ battery pack; $P_{total}$ is the total power of the parallel multi pack system; $R_{system}$ is the total resistance of the parallel multi pack system; and $R_{pack,k}$ is the pack resistance of the $k^{th}$ battery pack) In the parallel multi pack system MP, the first to $n^{th}$ battery packs P1 to Pn are connected in parallel. Therefore, when the present power of the parallel multi pack system MP is $P_{total}$, the pack power ($P_{pack,k}$) of each battery pack corresponds to the value calculated by the above equation.

According to the present disclosure, it is possible to prevent a battery pack having a low resistance among the battery packs of the parallel multi pack system MP from being overcharged or overdischarged unlike the prior art.

In the present disclosure, there is no particular limitation on the type of the storage unit 50 as long as it is a storage medium capable of recording and erasing information. As an example, the storage unit 50 may be a RAM, a ROM, an EEPROM, a register, or a flash memory. The storage unit 50 may also be electrically connected to the multi pack management unit 20 through, for example, a data bus so as to be accessed by the multi pack management unit 20.

The storage unit 50 also stores and/or updates and/or erases and/or transmits a program including various control logics performed by the multi pack management unit 20, and/or data generated when the control logic is executed and look-up tables and parameters defined in advance. The storage unit 50 may be logically divided into two or more parts and may be included in the multi pack management unit 20 without limitation.

In the present disclosure, the multi pack management unit 20 and/or the power management unit 40 may optionally include a processor, an application-specific integrated circuit (ASIC), another chipset, a logic circuit, a register, a communication modem, a data processing device, or the like, known in the art to execute the various control logics described above. In addition, when the control logic is implemented in software, the multi pack management unit 20 and/or the power management unit 40 may be implemented as a set of program modules. At this time, the program module may be stored in a memory and executed by a processor. The memory may be provided inside or outside the processor and be connected to the processor through various well-known computer components. Also, the memory may be included in the storage unit 50. In addition, the memory refers to a device in which information is stored, regardless of the type of device, and does not refer to a specific memory device.

In addition, one or more of the various control logics of the multi pack management unit 20 and/or the power management unit 40 may be combined, and the combined control logics may be written in a computer-readable code system and recorded in a computer-readable recording medium. The recording medium is not particularly limited as long as it is accessible by a processor included in a computer. As an example, the storage medium includes at least one selected from the group consisting of a ROM, a RAM, a register, a CD-ROM, a magnetic tape, a hard disk, a floppy disk and an optical data recording device. The code scheme may be distributed to a networked computer to be stored and executed therein. In addition, functional programs, codes and code segments for implementing the combined control logics may be easily inferred by programmers in the art to which the present disclosure belongs.

Figure 6:
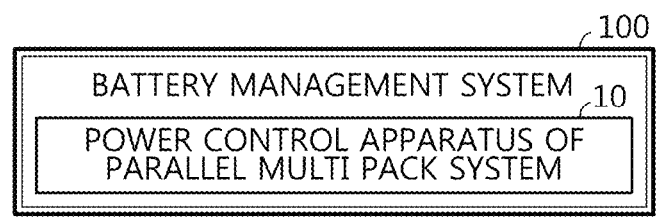
FIG. 6 is a block diagram showing a battery management system that includes the apparatus for controlling power of a parallel multi pack system according to an embodiment of the present disclosure.

The power control apparatus 10 according to an embodiment of the present disclosure may be included in a battery management system 100 as shown in FIG. 6. The battery management system 100 controls the overall operation related to charging and discharging of a battery, and is a computing system called a battery management system (BMS) in the art.

Figure 7:
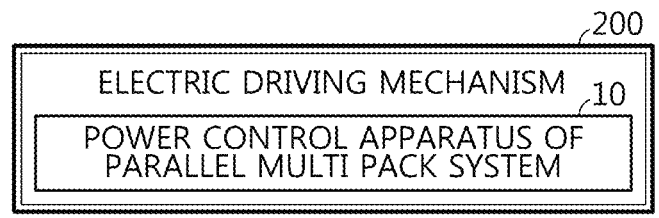
FIG. 7 is a block diagram showing an electric driving mechanism that includes the apparatus for controlling power of a parallel multi pack system according to an embodiment of the present disclosure.

In addition, the power control apparatus 10 according to the present disclosure may be mounted to various types of electric driving mechanism 200 as shown in FIG. 7, in addition to the electric-driven vehicle E.

The electric driving mechanism 200 may be an electric power device movable by electricity, such as an electric bicycle, an electric motorcycle, an electric train, an electric ship and an electric plane, or a power tool having a motor, such as an electric drill and an electric grinder.

Figure 4:
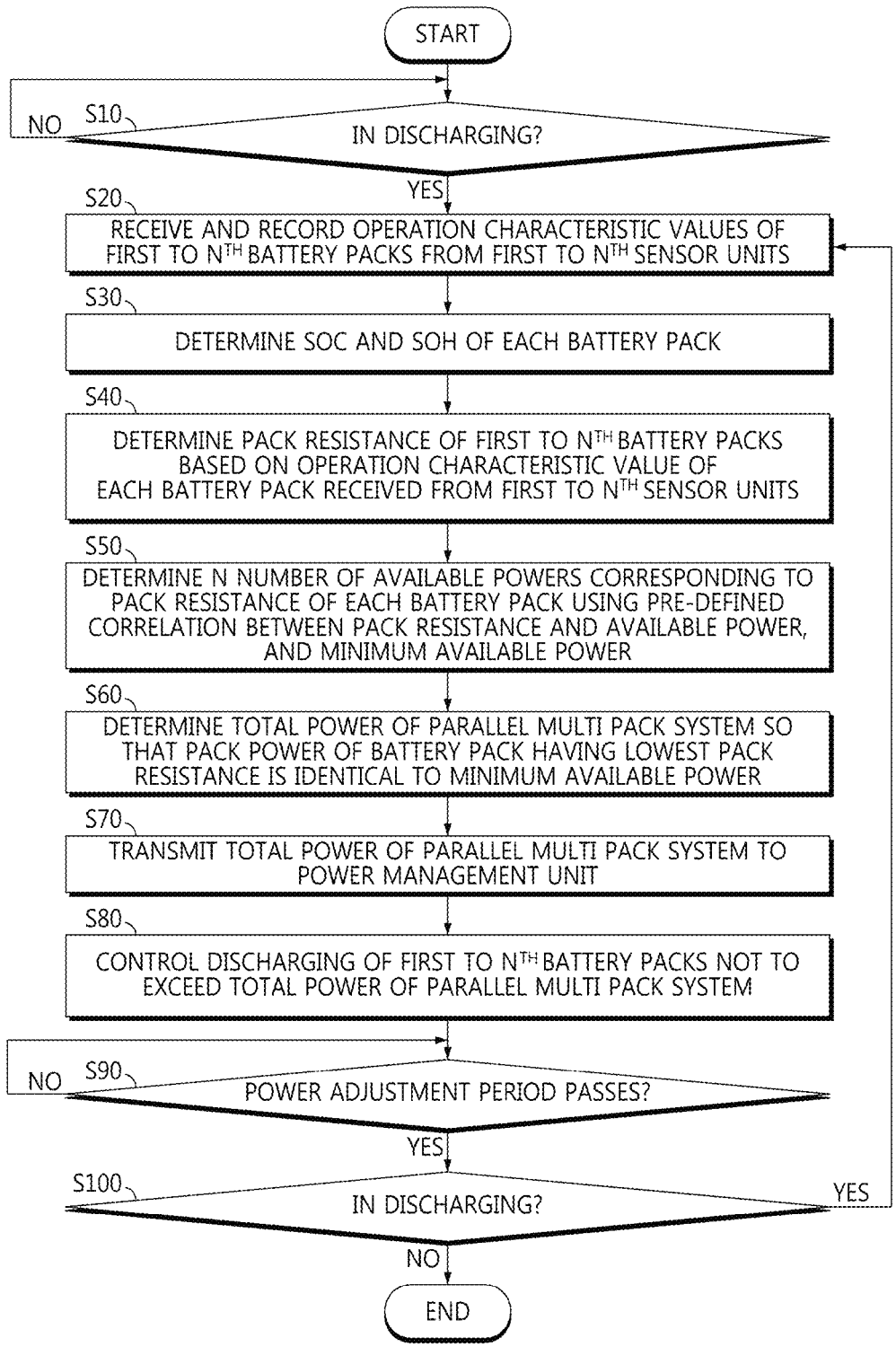
FIG. 4 is a flowchart for illustrating a method for controlling power of a parallel multi pack system according to an embodiment of the present disclosure.

FIG. 4 is a flowchart for illustrating a method for controlling power of a parallel multi pack system according to an embodiment of the present disclosure.

As shown in FIG. 4, in Step S10, the multi pack management unit 20 determines whether the parallel multi pack system MP is in a discharge state. To this end, the multi pack management unit 20 may monitor current values measured using the first to $n^{th}$ current sensors I1 to In. If the current values are positive rather than 0, it may be determined that the parallel multi pack system MP is being discharged. If the determination result of Step S10 is YES, the multi pack management unit 20 proceeds to Step S20.

In Step S20, the multi pack management unit 20 controls the first to $n^{th}$ sensor units SU1 to SUn to receive the operation characteristic values of the first to $n^{th}$ battery packs P1 to Pn from the first to $n^{th}$ sensor units SU1 to SUn, and records the same in the storage unit 50.

In the present disclosure, the operation characteristic value includes a measured voltage value, a measured current value and a measured temperature value of each battery pack. Step S30 proceeds after Step S20.

In Step S30, the multi pack management unit 20 determines SOC and SOH of each battery pack. The method of determining SOC and SOH has already been described above. Step S40 proceeds after Step S30.

In Step S40, the multi pack management unit 20 determines the pack resistances of the first to $n^{th}$ battery packs P1 to Pn, respectively, based on the operation characteristic value of each battery pack received from the first to $n^{th}$ sensor units SU1 to SUn.

Preferably, the multi pack management unit 20 may generate an I-V profile for a plurality of measured voltage values and a plurality of measured current values recently sampled based on the present time point by means of linear regression analysis, and calculate the pack resistance of each battery pack from a slope of the I-V profile. Step S50 proceeds after Step S40.

In Step S50, the multi pack management unit 20 determines an n number of available powers corresponding to the pack resistance of each battery pack using a pre-defined correlation between pack resistance and available power, and determines a minimum available power among the n number of available powers.

In an example, the multi pack management unit 20 may look up an available power corresponding to the pack resistance of each battery pack using the pack resistance-available power look-up table recorded in advance in the storage unit 50.

Preferably, in determining the available power of each battery pack, the multi pack management unit 20 may determine the available power by identifying the pack resistance-available power look-up table corresponding to the measured temperature value and SOH of the corresponding battery pack and looking up an available power corresponding to the pack resistance using the identified pack resistance-available power look-up table.

In another example, the multi pack management unit 20 may determine a current at a point where the I-V profile used in calculating the pack resistance intersects with the straight line $V=V_{min}$ corresponding to a discharge lower limit voltage as a maximum discharge current $I_{max,discharge}$, and determine a value calculated by the equation $V=V_{min}*|I_{max,discharge}|$ as the available power. Step S60 proceeds after Step S50.

In Step S60, the multi pack management unit 20 determines the total power ($P_{total}$) of the parallel multi pack system so that the pack power of the battery pack having a lowest pack resistance is identical to the minimum available power using Equation 1 above. Step S70 proceeds after Step S60. Here, the total power $P_{total}$ has a magnitude attenuated by $[\min(P_{pack,k})*n]*[1-\min(P_{pack,k})/\max(P_{pack,k})]$ compared to the total power calculated according to the prior art.

In Step S70, the multi pack management unit 20 transmits the total power ($P_{total}$) of the parallel multi pack system MP to the power management unit 40 of the electric-driven vehicle E through the communication unit 30. Step S80 proceeds after Step S70.

In Step S80, the power management unit 40 controls discharging of the parallel multi pack system MP so that the power of the parallel multi pack system MP does not exceed the total power ($P_{total}$) determined by Equation 1.

That is, the power management unit 40 controls the power consumption so that the power consumed in the load L does not exceed the total power ($P_{total}$) determined by Equation 1.

Specifically, the power management unit 40 adaptively distributes the power supplied to an inverter or a DC/DC converter corresponding to the load L and the power supplied to an electrical equipment unit and an ADAS (Advanced Driver Assistance System) unit, which supports functions of lane departure prevention, front collision warning or the like, so as not to exceed the total power ($P_{total}$) of the parallel multi pack system MP.

As a result, it is possible to fundamentally prevent the conventional problem that a battery pack having a low resistance among the battery packs of the parallel multi pack system MP is overcharged or overdischarged.

Step S90 proceeds after Step S80.

In Step S90, the multi pack management unit 20 determines whether a preset power adjustment period passes. The power adjustment period is several ten msec to several seconds. If the determination result of Step S90 is NO, the multi pack management unit 20 holds progression of the process. Meanwhile, if the determination result of Step S90 is YES, the multi pack management unit 20 proceeds to S100.

In Step S100, the multi pack management unit 20 determines whether the parallel multi pack system MP is being discharged. To this end, the multi pack management unit 20 may monitor the measured current values measured using the first to $n^{th}$ current sensors I1 to In. If the measured current values are positive rather than 0, it may be determined that the parallel multi pack system MP is being discharged.

If the determination result of Step S100 is NO, the multi pack management unit 20 ends the execution of the power control method according to an embodiment of the present disclosure. Meanwhile, if the determination result of Step S100 is YES, the multi pack management unit 20 proceeds to Step S20. Therefore, the process of calculating the total power ($P_{total}$) of the parallel multi pack system MP and the process of controlling the discharging of the parallel multi pack system MP so as not to exceed the calculated total power ($P_{total}$) are repeated again.

Meanwhile, the power control method described above relates to a case where the parallel multi pack system MP is discharged. However, it is obvious to those skilled in the art that the present disclosure may also be applied even when the parallel multi pack system MP is being charged.

FIG. 5 is a table comparatively showing results of an embodiment where the method for controlling power of a parallel multi pack system according to the present disclosure is applied and a comparative example where the prior art is applied together.

First, a parallel multi pack system including 5 battery packs (Pack1 to Pack5) connected in parallel was prepared. Then, while the parallel multi pack system is being discharged at 25□C, the total power of the parallel multi pack system and the power of each battery pack were calculated at a specific time point using the present disclosure and the prior art.

Referring to FIG. 5, the resistances of Pack1 to Pack5 were calculated as 120 mΩ, 110 mΩ, 100 mΩ, 90 mΩ and 80 mΩ, respectively. In addition, the SOHs of Pack1 to Pack5 were calculated as 0.94, 0.95, 0.96, 0.97 and 0.98, respectively. In addition, the available powers of Pack1 to Pack5 looked up from the pack resistance-available power look-up table identified by temperature and SOH were determined as 94 kW, 95 kW, 96 kW, 97 kW and 98 kW, respectively. The total resistance ($R_{system}$) of the parallel multi pack system MP was determined as 19.6 mΩ using the equation $[\Sigma(1/R_{pack,k})]^{-1}=(1/0.94+1/0.95+1/0.96+1/0.97+1/0.98)^{-1}$.

The total power ($P'_{total}$) of the parallel multi pack system MP according to the prior art is "$\min(P_{pack,k})*5$", which becomes 470 kW if 94 kW is put into $\min(P_{pack,k})$. The pack power ($P'_{pack,k}$) of each battery pack is calculated by the equation $P'_{total}*R_{system}/R_{pack,k}$. Therefore, the pack powers of Pack1 to Pack5 are 76.7 kW, 83.7 kW, 92.1 kW, 102.3 kW and 115.1 kW, respectively. The pack powers of Pack4 and Pack5 are greater than the available power. Therefore, if the total power ($P'_{total}$) of the parallel multi pack system MP is calculated according to the prior art and then the discharging of the parallel multi pack system MP is controlled accordingly, Pack4 and Pack5 are overdischarged.

Meanwhile, in the embodiment to which the present disclosure is applied, the total power ($P_{total}$) of the parallel multi pack system MP is calculated by the equation $\min(P_{pack,k})*\min(R_{pack,k})/R_{system}$. Here, $\min(P_{pack,k})$ is 94 kW because it is a minimum value among the available powers. Also, $\min(R_{pack,k})$ is 80 mΩ because it is a minimum value among the pack resistances. Also, $R_{system}$ is 19.6 mΩ. If the value of each factor is put into the equation, the total power ($P_{total}$) of the parallel multi pack system MP is determined as 383.8 kW. The pack power ($P_{pack,k}$) of each battery pack is calculated by the equation $P_{total}*R_{system}/R_{pack,k}$ in the same way as in the prior art. Thus, the pack powers of Pack1 to Pack5 are 62.7 kW, 68.4 kW, 75.2 kW, 83.6 kW and 94.0 kW, respectively. The pack power of Pack5, 94.0 kW, which is a maximum value, but it is identical to 94.0 kW, which is a minimum value among the actual available powers looked up from the pack resistance-available power look-up table. As such, if the total power is calculated according to the present disclosure, even a battery pack (Pack4, Pack5) with a relatively low resistance has a pack power lower than the available power. Therefore, the problem that the battery pack having a low resistance is overdischarged while the parallel multi pack system MP is being discharged does not occur.

It is obvious to those skilled in the art that the results of the above embodiment and the comparative example will be the same even when Pack1 to Pack5 connected in parallel are charged.

According to the present disclosure, the total power of the parallel multi pack system is adjusted so that the pack power of the battery pack having a lowest resistance among the battery packs included in the parallel multi pack system becomes identical to a minimum available power among available powers of the battery packs, thereby fundamentally preventing the battery pack having a low resistance from being overcharged or overdischarged. As a result, safety and reliability of the parallel multi pack system may be improved compared to the prior art.

In the description of the various exemplary embodiments of the present disclosure, it should be understood that the element referred to as 'unit' is distinguished functionally rather than physically. Therefore, each element may be selectively integrated with other elements or each element may be divided into sub-elements for effective implementation control logic (s). However, it is obvious to those skilled in the art that, if functional identity can be acknowledged for the integrated or divided elements, the integrated or divided elements fall within the scope of the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An apparatus for controlling a power of a parallel multi pack system, comprising:
first to $n^{th}$ sensor units configured to measure operation characteristic values of first to $n^{th}$ battery packs that are included in the parallel multi pack system and connected to each other in parallel;
a power management unit configured to control a power consumed in a load or a power provided by a charging device to correspond to a total power of the parallel multi pack system; and
a multi pack management unit operatively coupled to the first to $n^{th}$ sensor units and the power management unit, the multi pack management unit being configured to:
determine a pack resistance of each of the first to $n^{th}$ battery packs, based on the operation characteristic value of each battery pack received from the first to $n^{th}$ sensor units;
determine a minimum available power, among available powers respectively corresponding to the pack resistances of the battery packs, by using pre-defined correlation information between pack resistance and available power;

determine the total power of the parallel multi pack system so that the pack power of a battery pack having a lowest pack resistance becomes identical to the minimum available power; and transmit the determined total power of the parallel multi pack system to the power management unit, wherein the power management unit is further configured to control the power consumed in the load or the power provided by the charging device to not exceed the total power of the parallel multi pack system.

2. The apparatus for controlling power of a parallel multi pack system according to claim 1, wherein the correlation information is a pack resistance-available power look-up table in which the available power of the battery pack is defined according to the pack resistance of the battery pack.

3. The apparatus for controlling power of a parallel multi pack system according to claim 1, wherein the multi pack management unit is further configured to:

periodically receive a measured voltage value and a measured current value of each battery pack from the first to $n^{th}$ sensor units; and determine the pack resistance of each battery pack by analyzing the plurality of measured voltage values and the plurality of measured current values by linear regression analysis.

4. The apparatus for controlling power of a parallel multi pack system according to claim 1, wherein the multi pack management unit is further configured to calculate the total power of the parallel multi pack system using the following equation:

$$P_{total} = \min(P_{pack,k}) * \min(R_{pack,k}) / R_{system}$$
$$R_{system} = [\Sigma(1/R_{pack,k})]^{-1},$$

where:
k is an integer from 1 to n,
n is the number of battery packs,
$P_{total}$ is the total power of the parallel multi pack system,
$P_{pack,k}$ is a pack power of a $k^{th}$ battery pack; $R_{pack,k}$ is a pack resistance of the $k^{th}$ battery pack,
$R_{system}$ is a total resistance of the parallel multi pack system, and
min( ) is a function that returns a minimum value among a plurality of input variables.

5. The apparatus for controlling power of a parallel multi pack system according to claim 4, wherein the multi pack management unit is further configured to calculate the pack power of each battery pack using the following equation:

$P_{pack,k} = P_{total} * R_{system} / R_{pack,k}$, where:
$P_{pack,k}$ is the pack power of the $k^{th}$ battery pack,
$P_{total}$ is the total power of the parallel multi pack system,
$R_{system}$ is the total resistance of the parallel multi pack system, and
$R_{pack,k}$ is the pack resistance of the $k^{th}$ battery pack.

6. The apparatus for controlling power of a parallel multi pack system according to claim 1, further comprising a communication unit interposed between the multi pack management unit and the power management unit.

7. The apparatus for controlling power of a parallel multi pack system according to claim 6, wherein:

the parallel multi pack system is mounted to an electric-driven vehicle; and the power management unit is included in a control system of the electric-driven vehicle.

8. A battery management system, comprising the apparatus for controlling power of a parallel multi pack system according to claim 1.

9. An electric driving mechanism, comprising the apparatus for controlling power of a parallel multi pack system according to claim 1.

10. A method for controlling a power of a parallel multi pack system, the method comprising:

(a) providing first to $n^{th}$ sensor units configured to measure operation characteristic values of first to $n^{th}$ battery packs that are included in the parallel multi pack system and connected to each other in parallel;

(b) determining a pack resistance of each of the first to $n^{th}$ battery packs, based on the operation characteristic value of each battery pack received from the first to $n^{th}$ sensor units;

(c) determining an n number of available powers, respectively corresponding to the pack resistances of the battery packs, by using pre-defined correlation information between pack resistance and available power, and a minimum available power thereof;

(d) determining the total power of the parallel multi pack system so that the pack power of a battery pack having a lowest pack resistance becomes identical to the minimum available power; and (e) controlling charging or discharging of the first to $n^{th}$ battery packs to not exceed the total power of the parallel multi pack system.

11. The method for controlling power of a parallel multi pack system according to claim 10, wherein the correlation information is a pack resistance-available power look-up table in which the available power of the battery pack is defined according to the pack resistance of the battery pack.

12. The method for controlling power of a parallel multi pack system according to claim 10, wherein the determining in (b) includes:

(b1) periodically receiving a measured voltage value and a measured current value of each battery pack from the first to $n^{th}$ sensor units; and (b2) determining the pack resistance of each battery pack by analyzing the plurality of measured voltage values and the plurality of measured current values by linear regression analysis.

13. The method for controlling power of a parallel multi pack system according to claim 10, wherein, in the determining in (d), the total power of the parallel multi pack system is calculated using the following equation:

$$P_{total} = \min(P_{pack,k}) * \min(R_{pack,k}) / R_{system}$$
$$R_{system} = [\Sigma(1/R_{pack,k})]^{-1},$$

where:
k is an integer from 1 to n,
n is the number of battery packs,
$P_{total}$ is the total power of the parallel multi pack system,
$P_{pack,k}$ is a pack power of a $k^{th}$ battery pack,
$R_{pack,k}$ is a pack resistance of the $k^{th}$ battery pack,
$R_{system}$ is a total resistance of the parallel multi pack system, and min( ) is a function that returns a minimum value among a plurality of input variables.

14. The method for controlling power of a parallel multi pack system according to claim 10, wherein in the controlling in (e), the pack power of each battery pack is calculated using the following equation:

$P_{pack,k} = P_{total} * R_{system} / R_{pack,k}$, where:
$P_{pack,k}$ is the pack power of the $k^{th}$ battery pack,
$P_{total}$ is the total power of the parallel multi pack system,
$R_{system}$ is the total resistance of the parallel multi pack system, and
$R_{pack,k}$ is the pack resistance of the $k^{th}$ battery pack.

* * * * *